(12) United States Patent  
Okazaki et al.

(10) Patent No.: US 10,688,559 B2  
(45) Date of Patent: Jun. 23, 2020

(54) THREE DIMENSIONAL PRINTER

(71) Applicant: Sodick Co., Ltd., Kanagawa (JP)

(72) Inventors: Shuji Okazaki, Kanagawa (JP); Yasuyuki Miyashita, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 623 days.

(21) Appl. No.: 15/379,575

(22) Filed: Dec. 15, 2016

(65) Prior Publication Data

US 2017/0173689 A1  Jun. 22, 2017

(30) Foreign Application Priority Data

Dec. 22, 2015  (JP) .................................. 2015-249687

(51) Int. Cl.
| | |
|---|---|
| *B22F 3/105* | (2006.01) |
| *B33Y 50/02* | (2015.01) |
| *B33Y 10/00* | (2015.01) |
| *B33Y 30/00* | (2015.01) |
| *B22F 3/24* | (2006.01) |

(52) U.S. Cl.
CPC .............. *B22F 3/1055* (2013.01); *B22F 3/24* (2013.01); *B33Y 30/00* (2014.12); *B33Y 50/02* (2014.12); *B22F 2003/1057* (2013.01); *B22F 2003/247* (2013.01); *B22F 2998/10* (2013.01)

(58) Field of Classification Search
CPC .. B22F 3/1055; B22F 3/24; B22F 2003/1057; B22F 2003/247; B22F 2998/10; B33Y 30/00; B33Y 50/02; B33Y 10/00

See application file for complete search history.

(56) References Cited

U.S. PATENT DOCUMENTS

| | | |
|---|---|---|
| 2002/0041818 A1 | 4/2002 | Abe et al. |
| 2007/0252309 A1 | 11/2007 | Higashi et al. |

FOREIGN PATENT DOCUMENTS

| | | | | |
|---|---|---|---|---|
| JP | 2002-115004 A | | 4/2002 | |
| JP | 2002115004 A | * | 4/2002 | ............. B33Y 10/00 |
| JP | 2005-133120 A | | 5/2005 | |
| JP | 2005-336547 A | | 12/2005 | |

OTHER PUBLICATIONS

Office Action dated Aug. 30, 2016 of corresponding JP application No. 2015-249687; 9 pgs.

* cited by examiner

*Primary Examiner* — Colleen P Dunn  
*Assistant Examiner* — Anthony M Liang  
(74) *Attorney, Agent, or Firm* — Maier & Maier, PLLC (57) ABSTRACT

A lamination molding apparatus, including: a chamber covering a desired molding region and being filled with an inert gas of predetermined concentration; a molding table configured to be vertically controllable in the chamber; a laser beam emitter to irradiate a predetermined irradiation region with a laser beam to form a sintered layer and irradiate a predetermined target irradiation position with the laser beam to form a sintered trace, the irradiation region being disposed on a material powder layer formed on the molding table for each of a plurality of divided layers obtained by dividing a desired three-dimensional object at a predetermined thickness.

8 Claims, 9 Drawing Sheets

THREE DIMENSIONAL PRINTER

BACKGROUND OF THE INVENTION

Field of the Invention

The present invention relates to a lamination molding device and a correction method for correcting positional displacement thereof.

Background of the Invention

In a lamination molding method of metal using laser beam, inside a sealed chamber filled with an inert gas, a very thin material powder layer is formed on a molding table capable of moving vertically, followed by irradiation of a predetermined position of the material powder layer with a laser beam, thereby sintering the material powder. These procedures are repeated to attain the desired three-dimensional shape of a sintered object integrally formed by laminating a plurality of sintered layers. Preferably, while molding of the object, machining may be applied to the surface or unnecessary portion of the sintered object obtained by sintering the material powder, using a rotary cutting tool capable of moving horizontally and vertically such as an end mill or the like. Over the combination and repetition of these steps, a desired molded object is formed.

Such a lamination molding apparatus for lamination may include a plurality of heat sources, which generate thermal displacement in various units. In particular, positional displacement due to the thermal displacement is problematic for a laser beam emitter to irradiate a predetermined position of the material powder layer with a laser beam because the laser beam emitter is provided at a position more distant from the material powder layer on the molding table than a cutting device including the rotary cutting tool. Thus, in order to maintain the accuracy of lamination molding, regularly performing a correction is desired such that laser beam coordinates and spindle coordinates correspond to each other, the laser beam coordinates being the coordinates of the laser beam emitter, the spindle coordinates being the coordinates of the cutting tool.

In Patent Literature 1 disclosed, in order to match the coordinates of an irradiated position of the laser beam (light beam coordinates in the reference) and the coordinates of the machining head (cutting coordinates in the reference), a dedicated calibration plate is placed on the molding table in advance. Then, some marks (a sintered mark and a cut mark, corresponding to each of the coordinates) are applied onto each predetermined position of the calibration plate, and positional displacement is calculated by comparison of the positions of these marks. Further, the light beam coordinates are corrected based on the positional displacement.

PRIOR ART DOCUMENTS

Patent Literature

[Patent Literature 1] JP 3587208

SUMMARY OF INVENTION

Technical Problem

However, the method of Patent Literature 1 requires a dedicated calibration plate and two kinds of marks respectively provided by the cutting means and the light beam irradiation means each time the positional displacement is calculated. Furthermore, external air is subject to flow into the chamber when the chamber is opened for attaching or detaching the calibration plate. Therefore, when calculating the positional displacement during the molding process, it takes time to resume the molding process because the chamber needs refilling with inert gas.

The present invention has been made by taking these circumstances into consideration. An objective of the present invention is to provide a lamination molding apparatus which can easily calculate positional displacement between a target irradiation position and an actual irradiation position of a laser beam, based on a sintered trace formed on material powder.

Means to Solve the Problem

According to the present invention, a lamination molding apparatus, comprising: a chamber covering a desired molding region and being filled with an inert gas of predetermined concentration; a molding table configured to be vertically controllable in the chamber; a laser beam emitter to irradiate a predetermined irradiation region with a laser beam to form a sintered layer and irradiate a predetermined target irradiation position with the laser beam to form a sintered trace, the irradiation region being disposed on a material powder layer formed on the molding table for each of a plurality of divided layers obtained by dividing a desired three-dimensional object at a predetermined thickness, and the target irradiation position being disposed on the material powder layer; a cutting device including a cutting tool capable of moving in the chamber; an imaging unit to capture the sintered trace; a calculating means to calculate a positional displacement by comparison of the target irradiation position and an actual irradiation position, the actual irradiation position being determined according to the sintered trace; and a correction means to correct the laser beam emitter based on the positional displacement such that laser beam coordinates and spindle coordinates are consistent, the laser beam coordinates being coordinates of the laser beam emitter, and the spindle coordinates being coordinates of the cutting tool, is provided.

According to another aspect of the present invention, a correction method for correcting positional displacement of a lamination molding apparatus, comprising: a supplying step to supply a material powder on a molding table; a forming step to form a sintered trace by irradiation of a predetermined target irradiation position with a laser beam, the sintered trace being formed by sintering the material powder; a capturing step to capture the sintered trace; a calculating step to calculate positional displacement by comparison of the target irradiation position and an actual irradiation position, the actual irradiation position being determined according to the sintered trace; a correcting step to correct a laser beam emitter based on the positional displacement such that laser beam coordinates and spindle coordinates are consistent, the laser beam coordinates being coordinates of the laser beam emitter, the spindle coordinates being coordinates of a cutting tool, is provided.

Effect of the Invention

In the present invention, a sintered trace is formed on the material powder by irradiation of a laser beam, based on an input of predetermined target irradiation position. The sintered trace is captured, the target irradiation position and the actual irradiation position based on the sintered trace are compared to each other, and thus the positional displacement is calculated. That is, the positional displacement can easily be calculated and corrected without a dedicated calibration plate or the like.

Hereinafter, various embodiments of the present invention will be provided. The embodiments provided below can be combined with each other.

Preferably, the imaging unit and the cutting tool are provided on a common drive mechanism.

Preferably, the cutting tool is configured to form a cut trace on the sintered trace; and the imaging unit is configured to capture the cut trace such that imaging system coordinates and the spindle coordinates correspond to each other, the imaging system coordinates being coordinates of the imaging unit.

Preferably, the cutting tool is configured to form a cut trace on the sintered trace; and the imaging unit is configured to capture the cut trace such that imaging system coordinates and the spindle coordinates correspond to each other, the imaging system coordinates being coordinates of the imaging unit.

Preferably, the correction means is configured to correct the laser beam emitter when the positional displacement is equal to or greater than a predetermined threshold value.

Preferably, the apparatus is so configured that a molding process of a lamination molded object is cancelled when the positional displacement is equal to or greater than a predetermined threshold value.

Preferably, the laser beam emitter is configured to form at least two of the sintered traces; and the imaging unit captures the at least two of the sintered traces.

Preferably, the laser beam emitter irradiates the material powder in a region with the laser beam to form the sintered trace such that the sintered layer and the sintered trace are not stuck together or do not overlap each other in the region.

Preferably, a molding plate provided on the molding table, the molding plate having a smaller area than a surface of the molding table, is further comprised, and the laser beam emitter forms the sintered trace within a margin region, the margin region being disposed, on the molding table, outside of the molding plate.

Preferably, an imaging unit utilized in the capturing step and the cutting tool are provided on a common drive mechanism.

Preferably, the cutting tool forms a cut trace on the sintered trace and the cut trace is captured in the capturing step such that imaging system coordinates and spindle coordinates correspond to each other, the imaging system coordinates being coordinates of an imaging unit, the spindle coordinates being coordinates of the cutting tool.

Preferably, in the correcting step, the laser beam emitter is corrected when the positional displacement is equal to or greater than a predetermined threshold value.

Preferably, in the correcting step, a molding process of a lamination molded object is cancelled when the positional displacement is equal to or greater than a predetermined threshold value.

Preferably, at least two of the sintered traces are formed in the forming step and captured in the capturing step.

Preferably, in the forming step, the sintered trace is formed within a region, a sintered layer being formed by sintering the material powder in the region, the sintered layer and the sintered trace not being stuck together or overlapping each other.

Preferably, in the forming step, the sintered trace is formed by sintering the material powder within a margin region, the margin region being disposed, on the molding table, outside of a molding plate.

Preferably, in the correcting step, the laser beam emitter is corrected at a predetermined time interval.

DESCRIPTION OF THE PREFERRED EMBODIMENTS

Hereinafter, some embodiments of the present invention will be described with reference to the drawings. Here, the characteristic matters shown in the embodiments can be combined with each other.

Figure 1:
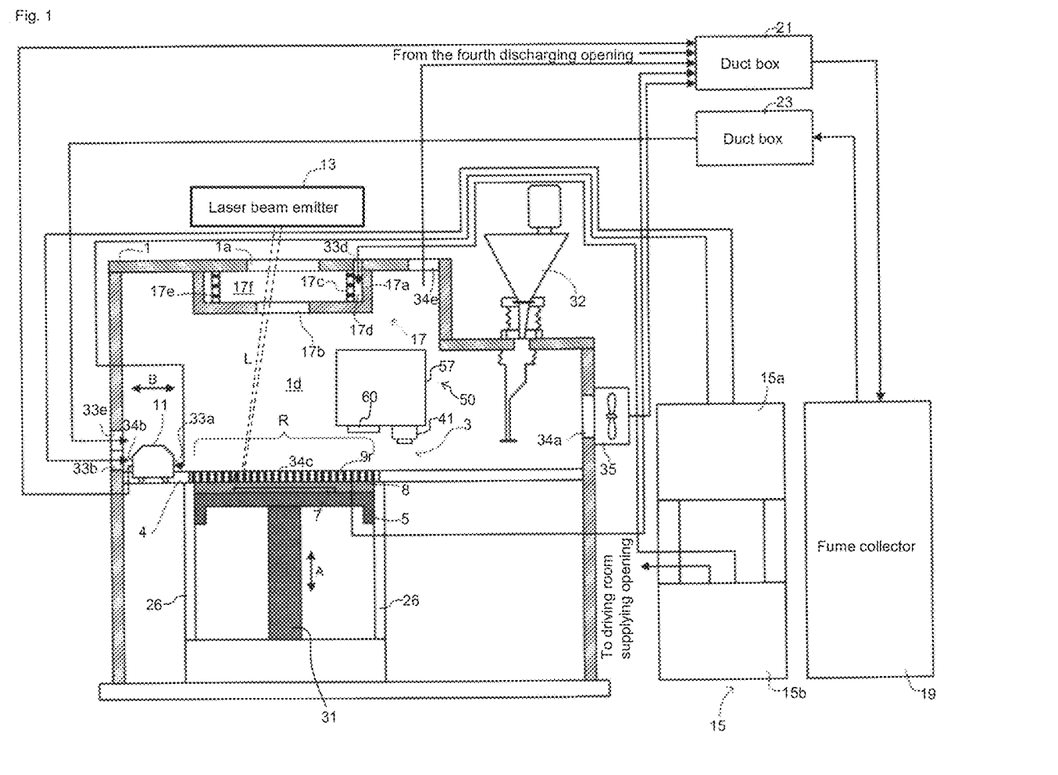
FIG. 1 is a schematic diagram of the lamination molding apparatus according to one embodiment of the present invention.
Figure 2:
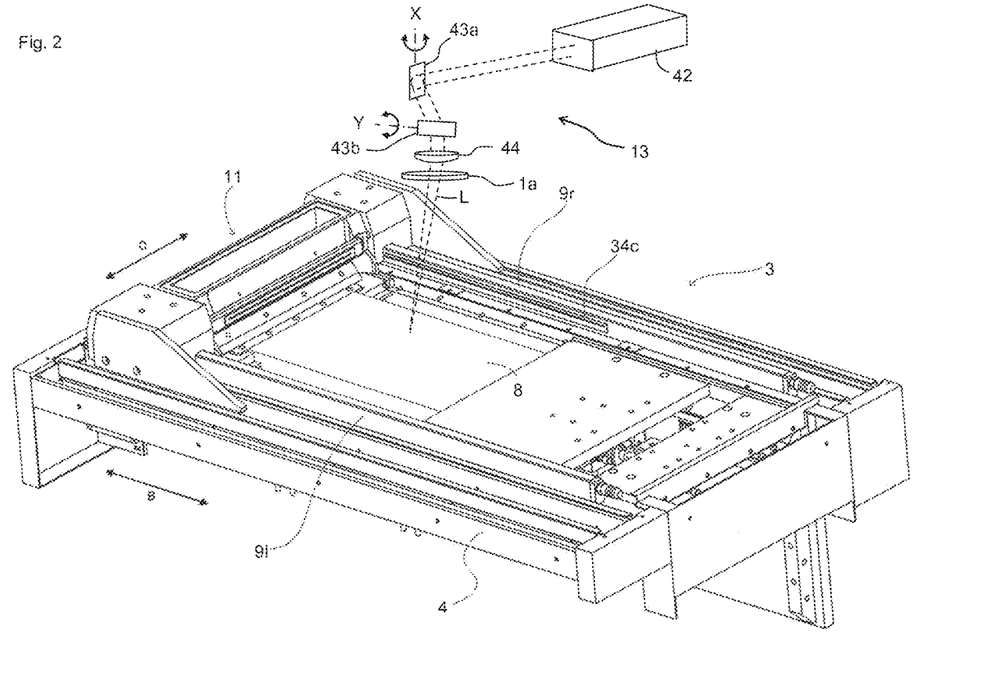
FIG. 2 is a perspective view showing a powder layer forming apparatus 3 and laser beam emitter 13 according to one embodiment of the present invention.

As shown in FIGS. 1 and 2, the lamination molding apparatus according to one embodiment of the present invention comprises a chamber 1 and a laser beam emitter 13.

The chamber 1 comprises a front chamber including a molding room 1d in which a lamination molded object is formed, and a rear chamber including a driving room which accommodates the most part of a machining head driving mechanism for moving a spindle head 60 on which a rotary cutting tool is mounted to an arbitrary position in the molding room 1d. The molding room 1d and driving room are partitioned by stretchable bellows whereas a communicating portion, a slight clearance to allow inert gas to pass through, is provided between the molding room 1d and driving room. Note that in FIG. 1 the front chamber as seen from the front is shown but the rear chamber is not shown. The chamber 1 is configured to cover the required molding region R, and is filled with the inert gas of a predetermined concentration. A powder layer forming apparatus 3 is provided inside the chamber 1, and a fume diffusing device 17 is attached on the upper surface portion thereof. The powder layer forming apparatus 3 includes a base 4, a recoater head 11 and elongated members 9r and 9l.

The base 4 includes a molding region R in which a lamination molded object is formed. A molding table 5 is provided with the molding region R and is driven by a molding table drive mechanism 31, thereby being capable of moving vertically (direction shown by arrow A in FIG. 1). When the lamination molding apparatus is operated, on the molding table 5, a molding plate 7 is arranged of which area is smaller than the surface area of the molding table 5, and a material powder layer 8 is formed thereon. A predetermined irradiation region existing in the molding region R is substantially consistent with the area surrounded by the contour of a desired three-dimensional molded object.

A powder retaining wall 26 is provided around the molding table 5, and the non-sintered material powder is retained in the powder retaining space surrounded by the powder retaining wall 26 and the molding table 5. Although not shown in FIG. 1, below the powder retaining wall 26, a powder discharging section capable of discharging the material powder in the powder retaining space may be provided. In this case, after completion of the lamination molding, the molding table 5 is descended so as to discharge the non-sintered material powder from the powder discharging section. The material powder discharged is guided to the chute by the chute guide, and then the material powder is retained in the bucket via the chute.

Figure 3:
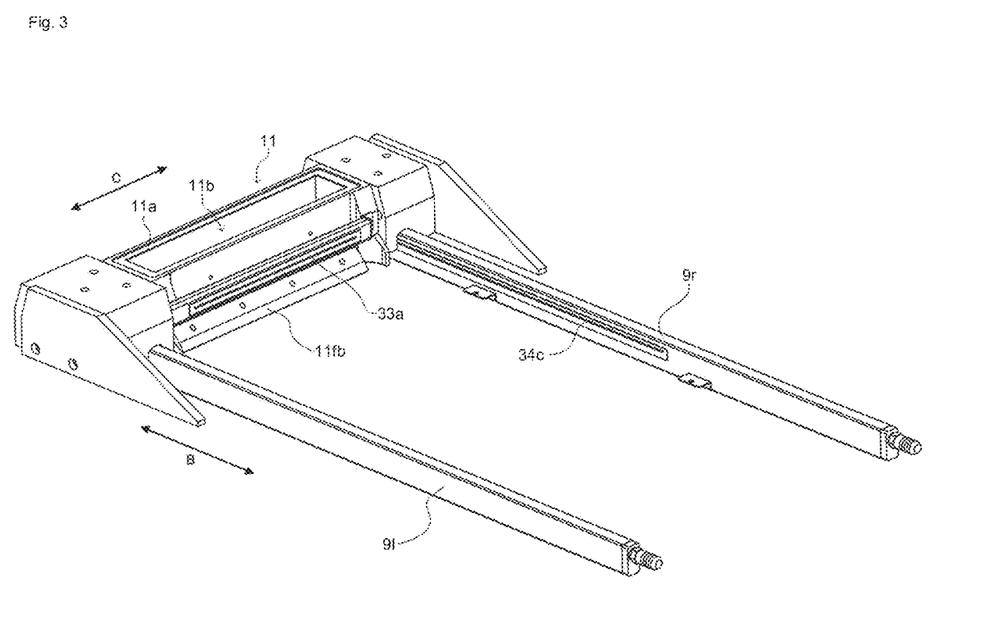
FIG. 3 is a perspective view of a recoater head 11 according to one embodiment of the present invention.
Figure 4:
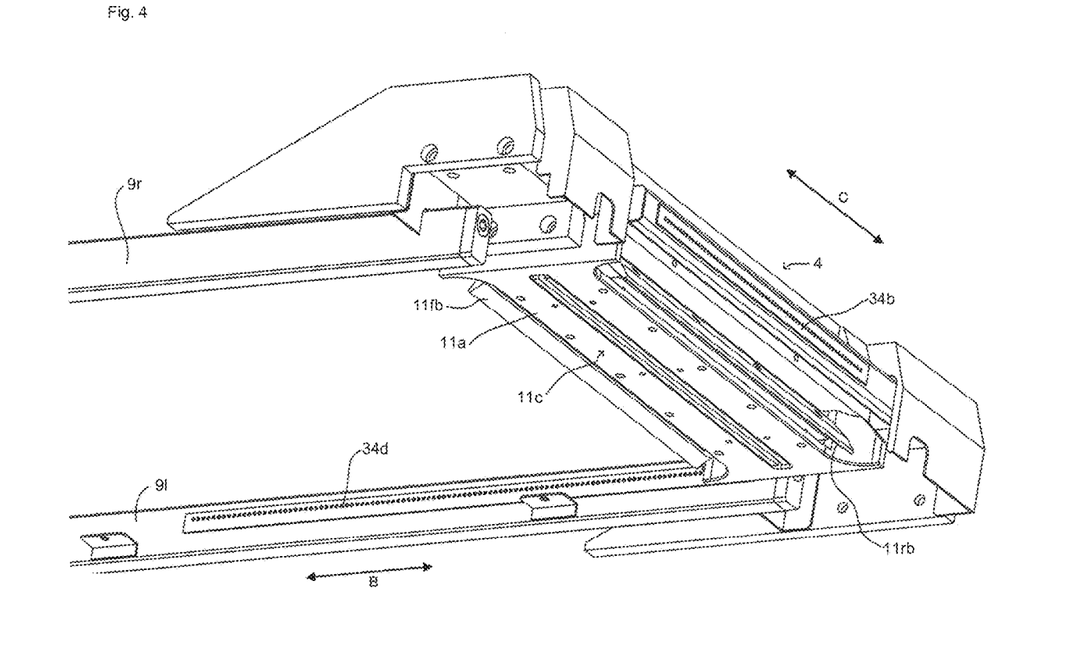
FIG. 4 is a perspective view of a recoater head 11 from another angle according to one embodiment of the present invention.

As shown in FIGS. 2 to 4, the recoater head 11 comprises a material holding section 11*a*, material supplying section 11*b* and material discharging section 11*c*.

The material holding section 11*a* stores the material powder. Note that the material powder is, for example, metal powder such as iron powder having a sphere shape with an average particle diameter of 20 µm. The material supplying section 11*b* is provided on the top surface of the material holding section 11*a*, and is configured to receive the material powder to be supplied from a material supplying device 32 to the material holding section 11*a*. The material discharging section 11*c* is provided on the bottom surface of the material holding section 11*a*, and discharges the material powder in the material holding section 11*a*. Note that the material discharging section 11*c* has a slit shape which elongates in the horizontal uniaxial direction (direction shown by arrow C) crossing orthogonally with the moving direction (direction shown by arrow B) of the recoater head 11.

Blades 11*fb* and 11*rb*, a first supplying opening 33*a*, and a second discharging opening 34*b* are provided on both sides of the recoater head 11. The blades 11*fb* and 11*rb* supply the material powder. In other words, the blades 11*fb* and 11*rb* form a material powder layer 8 by planarizing the material powder discharged from the material discharging section 11*c*. The first supplying opening 33*a* and second discharging opening 34*b* are provided along the horizontal uniaxial direction (direction shown by arrow C) crossing orthogonally with the moving direction (direction shown by arrow B) of the recoater head 11, thereby supplying and discharging the inert gas, respectively (details to be described later). Here, in the present specification, "inert gas" is a gas which substantially does not react with the material powder, and nitrogen gas, argon gas and helium gas can be mentioned for example.

The elongated members 9*r* and 9*l* are provided with a third discharging opening 34*c* and fourth discharging opening 34*d* along the moving direction (direction shown by arrow B) of the recoater head 11. The third discharging opening 34*c* and fourth discharging opening 34*d* allow fume to be discharged efficiently (details to be described later).

A cutting device 50 includes a machining head 57 and spindle head 60. The spindle head 60 and an imaging unit 41 are provided on the machining head 57 which is controllable by a machining head drive mechanism (not shown) such that the machining head 57 horizontally/vertically moves the spindle head 60 and imaging unit 41 to a desired position. That is, the spindle coordinates, which are the coordinates of the rotary cutting tool attached to the spindle head 60, and the imaging system coordinates, which are the coordinates of the imaging unit 41, are consistent with or correspondent to each other.

The spindle head 60 is configured to rotate with attaching a rotary cutting tool such as an end mill or the like (not shown) such that cutting can be applied to the surface or unnecessary portions of the sintered layer obtained by sintering the material powder. Further, preferably the rotary cutting tool comprises plural kinds of rotary cutting tools, and the rotary cutting tool being used can be exchanged by an automatic tool changer (not shown) even during the molding process.

The imaging unit 41 is, for example, a CCD camera having dynamic range of the visible light. In particular, the imaging unit 41 is used in a correction (described later) which allows the irradiation position of the laser beam and the spindle position to be substantially consistent with each other.

On the upper surface of the chamber 1, the fume diffusing device 17 is provided so as to cover a window 1*a*. The fume diffusing device 17 is provided with a cylindrical housing 17*a* and a cylindrical diffusing member 17*c* arranged in the cylindrical housing 17*a*. An inert gas supplying space 17*d* is provided in between the cylindrical housing 17*a* and the cylindrical diffusing member 17*c*. Further, on the bottom surface of the cylindrical housing 17*a*, an opening 17*b* is provided at the inner portion of the cylindrical diffusing member 17*c*. The cylindrical diffusing member 17*c* is provided with a plurality of pores 17*e*, and the clean inert gas supplied into the inert gas supplying space 17*d* is filled into a clean room 17*f* through the pores 17*e*. Then, the clean inert gas filled in the clean room 17*f* is blown out towards below the fume diffusing device 17 through the opening 17*b*.

A laser beam emitter 13 is provided above the chamber 1. The laser beam emitter 13 irradiates, with laser beam L, a predetermined position of the material powder layer 8 formed on the molding region R so as to sinter the material powder at the irradiation position. Specifically, the laser beam emitter 13 comprises a laser beam source 42, two-axis galvanometer mirrors 43*a* and 43*b*, and a condensing lens 44. The galvanometer mirrors 43*a* and 43*b* includes actuators rotating the galvanometer mirrors 43*a* and 43*b*, respectively.

The laser beam source 42 emits the laser beam L. The type of the laser beam L is a laser beam capable of sintering the material powder. For example, $CO_2$ laser, fiber laser, YAG laser and the like can be used.

The two-axis galvanometer mirrors 43*a* and 43*b* perform two-dimensional scanning of the laser beam L emitted from the laser beam source 42 controllably. The galvanometer mirror 43*a* scans the laser beam L in the direction shown by arrow B (X-axis direction), and the galvanometer mirror 43*b* scans the laser beam L in the direction shown by arrow C (Y-axis direction). Each of the galvanometer mirrors 43*a* and 43*b* is controlled of its rotation angle depending on the size of the rotation angle controlling signal input from a control device (not shown). Accordingly, the laser beam L can be emitted to a desired position by altering the size of the rotation angle controlling signal being input to each of the actuators of the galvanometer mirrors 43*a* and 43*b*.

The condensing lens 44 is, for example fθ lens, to condense the laser beam L emitted from the laser beam source 42. Note that, the condensing lens 44 may be arranged between the laser beam source 42, and the galvanometer mirrors 43a and 43b along the laser beam L.

The laser beam L which passed through the galvanometer mirrors 43a and 43b and the condensing lens 44 further passes through the window 1a provided to the chamber 1. Then, the material powder layer 8 formed in the molding region R is irradiated with the laser beam L. The window 1a is formed with a material capable of transmitting the laser beam L. For example, in a case where the laser beam L is fiber laser or YAG laser, the window 1a can be structured with a quartz glass.

Next, the inert gas supplying/discharging system is explained. The inert gas supplying/discharging system comprises the fume diffusing device 17, an inert gas supplying apparatus 15, a fume collector 19, and duct boxes 21 and 23. In the inert gas supplying/discharging system, the chamber 1 is supplied with the inert gas so as to be constantly filled with a predetermined concentration or more of the inert gas while the inert gas contaminated with fume generated by the irradiation of the laser beam L are discharged to the outside of the chamber 1.

The inert gas supplying/discharging system comprises a plurality of supplying openings and discharging openings of the inert gas, provided to the chamber 1, and pipes connecting each of the supplying openings and discharging openings, and the inert gas supplying apparatus 15 and the fume collector 19. The supplying openings of the present embodiment comprise a first supplying opening 33a, second supplying opening 33b, sub supplying opening 33e, fume diffusing device supplying opening 33d and driving room supplying opening (not shown). The discharging openings of the present embodiment comprise the first discharging opening 34a, second discharging opening 34b, third discharging opening 34c, fourth discharging opening 34d and a sub discharging opening 34e.

The first supplying opening 33a is provided so as to depend on the installation position of the first discharging opening 34a and to face the first discharging opening 34a. Desirably, the first supplying opening 33a is provided on one side of the recoater head 11 along the direction shown by arrow C so as to face the first discharging opening 34a when the recoater head 11 is positioned on the opposite side across a predetermined irradiation region with respect to a position at which the material supplying device 32 is installed.

The first discharging opening 34a is provided on the side wall of the chamber 1 at a certain distance from a predetermined irradiation region so as to face the first supplying opening 33a. A suction device 35 is provided connecting with the first discharging opening 34a. The suction device 35 facilitates eliminating the fume efficiently from the optical path of the laser beam L. In addition, the suction device 35 enables a greater amounts of fumes to be discharged through the first discharging opening 34a, thereby the fume diffusion within the molding room 1d is alleviated.

The second supplying opening 33b is provided on the edge of the base 4 so as to face the first discharging opening 34a across a predetermined irradiation region. The second supplying opening 33b is selectively switched to open, but instead the first supplying opening 33a is switched to close when the recoater head 11 is positioned on the opposite side with respect to the first supplying opening 33a, without placing a predetermined irradiation region therebetween. The second supplying opening 33b supplies the inert gas into the first discharging opening 34a, of which pressure and flow rate are the same as the inert gas supplied from the first supplying opening 33a, thereby generating a flow of the inert gas in the same direction. Consequently, stable sintering is beneficially provided.

The second discharging opening 34b is provided on the opposite side of the side in which the first supplying opening 33a is provided, of recoater head 11 along the direction shown by arrow C. While the first supplying opening 33a does not supply the inert gas, in other words, the second supplying opening 33b supplies the inert gas, some fume is discharged by generating a flow of the inert gas in the more vicinity of a predetermined irradiation region, thereby eliminating the fume more efficiently from the optical path of the laser beam L.

The third discharging opening 34c and fourth discharging opening 34d are provided on the elongated members 9r and 9l respectively along the direction shown in arrow B within a range not exceeding the maximum supply amount of the inert gas in the inert gas supplying/discharging system. In the case where a predetermined region is larger and then an irradiation spot of the laser beam L exists at the front-side or rear-side edge of the predetermined irradiation region, the fume may fail to be carried by a flow of the inert gas formed from the first supplying opening 33a or second supplying opening 33b toward the first discharging opening 34a, consequently the fume may drift. The third discharging opening 34c and fourth discharging opening 34d enable the fume to be discharged more efficiently.

The inert gas supplying/discharging system of the present embodiment comprises the sub supplying opening 33e, fume diffusing device supplying opening 33d, driving room supplying opening (not shown) and sub discharging opening 34e. The sub supplying opening 33e is provided on the side wall of the chamber 1 so as to face the first discharging opening 34a, and supplies clean inert gas, of which the fume is removed, sent from the fume collector 19 into the molding room 1d. The fume diffusing device supplying opening 33d is provided on the upper surface of the chamber 1 and supplies the inert gas into the fume diffusing device 17. The driving room supplying opening is provided on the rear chamber of the chamber 1, and supplies the inert gas into the driving room (not shown). The sub discharging opening 34e is provided above the first discharging opening 34a, and discharges the inert gas containing a large amount of fume which remains on the upper side of the chamber 1.

On the upper surface of the chamber 1, the fume diffusing device 17 is provided so as to cover the window 1a. The fume diffusing device 17 is provided with a cylindrical housing 17a and a cylindrical diffusing member 17c arranged in the cylindrical housing 17a. An inert gas supplying space 17d is provided in between the cylindrical housing 17a and the cylindrical diffusing member 17c. Further, on the bottom surface of the cylindrical housing 17a, an opening 17b is provided at the inner portion of the cylindrical diffusing member 17c. The cylindrical diffusing member 17c is provided with a plurality of pores 17e, and the clean inert gas supplied into the inert gas supplying space 17d via the fume diffusing device supplying opening 33d is filled into a clean room 17f through the pores 17e. Then, the clean inert gas filled in the clean room 17f is discharged towards below the fume diffusing device 17 through the opening 17b. The clean inert gas discharged flows out along the optical path of the laser beam L, and eliminates the fume from the optical path of the laser beam L, thereby preventing the window 1a from being contaminated with the fume.

The inert gas supplying system to supply the inert gas into the chamber 1 is connected with the inert gas supplying apparatus 15 and fume collector 19. The inert gas supplying apparatus 15 has a function to supply the inert gas, and is, for example, a device comprising a membrane type nitrogen separator to extract the nitrogen gas from the circumambient air. The inert gas supplying apparatus 15 of the present embodiment comprises a first inert gas supplying apparatus 15a to supply the inert gas through the first supplying opening 33a and second supplying opening 33, and a second inert gas supplying apparatus 15b to supply the inert gas through the fume diffusing device supplying opening 33d and driving room supplying opening (not shown). Preferably, the first inert gas supplying apparatus 15a is capable of controlling the concentration of the inert gas. The second inert gas supplying apparatus 15b may be an apparatus having the same structure as the first inert gas supplying apparatus 15a, or may not have a function to control the concentration of the inert gas since it connects with the supplying openings in a relatively distant position from the molding region R and the control of the concentration of the inert gas is not of importance relatively. The fume collector 19 comprises duct boxes 21 and 23 provided at its upper stream side and its lower stream side, respectively. The inert gas containing fume discharged from the chamber 1 is sent to the fume collector 19 through the duct box 21. Then, fume is removed in the fume collector 19, and the cleaned inert gas is sent to the sub supplying opening 33e of the chamber 1 through the duct box 23. According to such constitution, the inert gas can be recycled.

For the inert gas supplying system as shown in FIG. 1, the first inert gas supplying apparatus 15a is respectively connected with the first supplying opening 33a and second supplying opening 33b. Then, the second inert gas supplying apparatus 15b is respectively connected with the fume diffusing device supplying opening 33d and driving room supplying opening (not shown). Further, the fume collector 19 and sub supplying opening 33e are connected through the duct box 23. The first inert gas supplying apparatus 15a and second inert gas supplying apparatus 15b have their control valves opened by a predetermined amount through a control device, thereby supplying each of the clean inert gas having a predetermined pressure and flow rate into the chamber 1. The inert gas supplied into the chamber 1 is supplied into the molding room 1d through a communication unit positioned between the molding room 1d and driving room (not shown).

In the lamination molding apparatus of the present embodiment, when a door provided at an opening communicating with the molding room 1d is opened, the control device detects opening state of the door by a door detector (not shown) capable of detecting opening/closing of the door, and stops the first inert gas supplying apparatus 15a whereas the second inert gas supplying apparatus 15b is configured to continue supplying the inert gas. While the door is open, the inert gas diffuses into the atmosphere even if supplying the inert gas into molding room 1d. Therefore, by stopping the supply of the inert gas into the molding room 1d while the door is open, the wasteful supply of the inert gas can be suppressed.

For the inert gas discharging system as shown in FIG. 1, the first discharging opening 34a, second discharging opening 34b, third discharging opening 34c, fourth discharging opening 34d and sub discharging opening 34e, fourth discharging opening 34d and sub discharging opening 34e are respectively connected with the fume collector 19 through the duct box 21. The inert gas after removal of the fume by the fume collector 19 returns to the chamber 1 and is recycled.

(Lamination Molding Method)

Next, referring to FIGS. 1 and 5-7, the lamination molding method using the afore-mentioned lamination molding apparatus will be explained. Note that the inert gas supplying/discharging system is not shown in FIG. 5-7.

Figure 5:
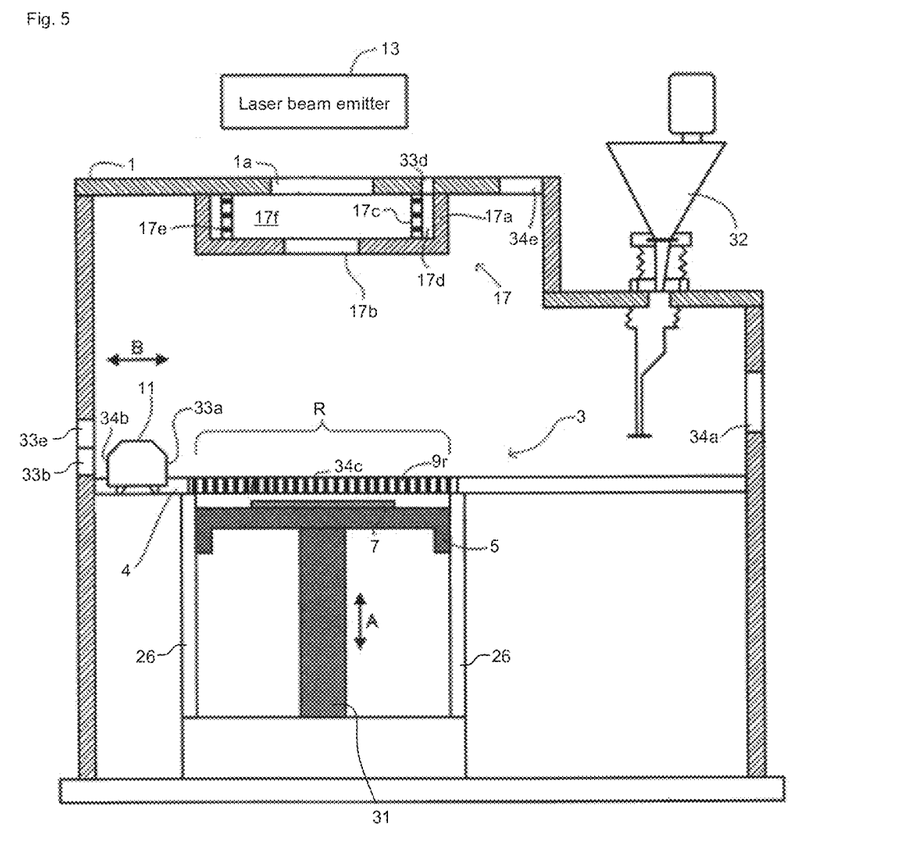
FIG. 5 is a diagram for explaining a lamination molding method using a lamination molding apparatus according to one embodiment of the present invention.

First, the molding plate 7 is placed on the molding table 5, and the height of the molding table 5 is adjusted to an appropriate position (as shown in FIG. 5). In this state, the recoater head 11 with the material holding section 11a being filled with the material powder is moved from the left side to the right side of the molding region R, in the direction shown by arrow B in FIG. 5. Accordingly, a first layer of the material powder layer 8 is formed on the molding plate 7.

Figure 6:
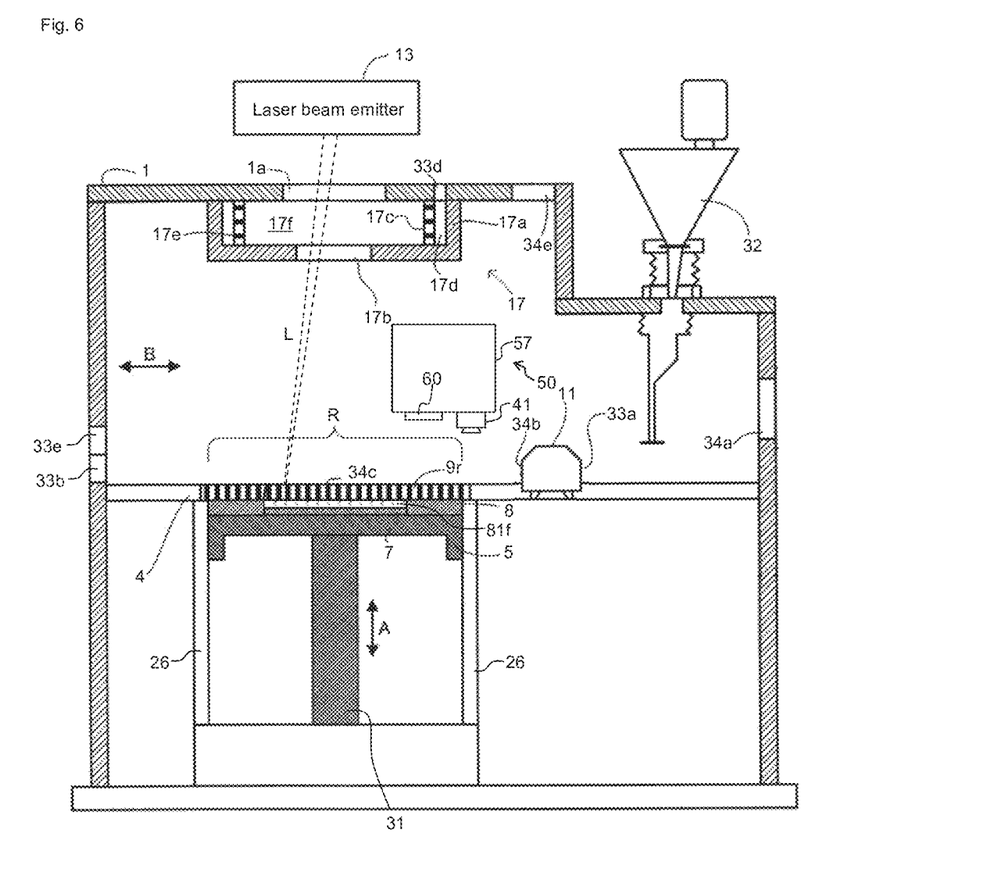
FIG. 6 is a diagram for explaining the lamination molding method using the lamination molding apparatus according to one embodiment of the present invention.

Subsequently, predetermined portion of the material powder layer 8 is irradiated with the laser beam L, thereby sintering the portion of the material powder layer 8 being irradiated with the laser beam. Accordingly, the first layer of sintered layer 81f being a divided layer having a predetermined thickness with respect to an entire lamination molded object is obtained as shown in FIG. 6.

Then, the height of the molding table 5 is descended by the predetermined thickness (one layer) of the material powder layer 8. Subsequently, the recoater head 11 is moved from the right side to the left side of the molding region R. Accordingly, a second layer of the material powder layer 8 is formed on the sintered layer 81f.

Figure 7:
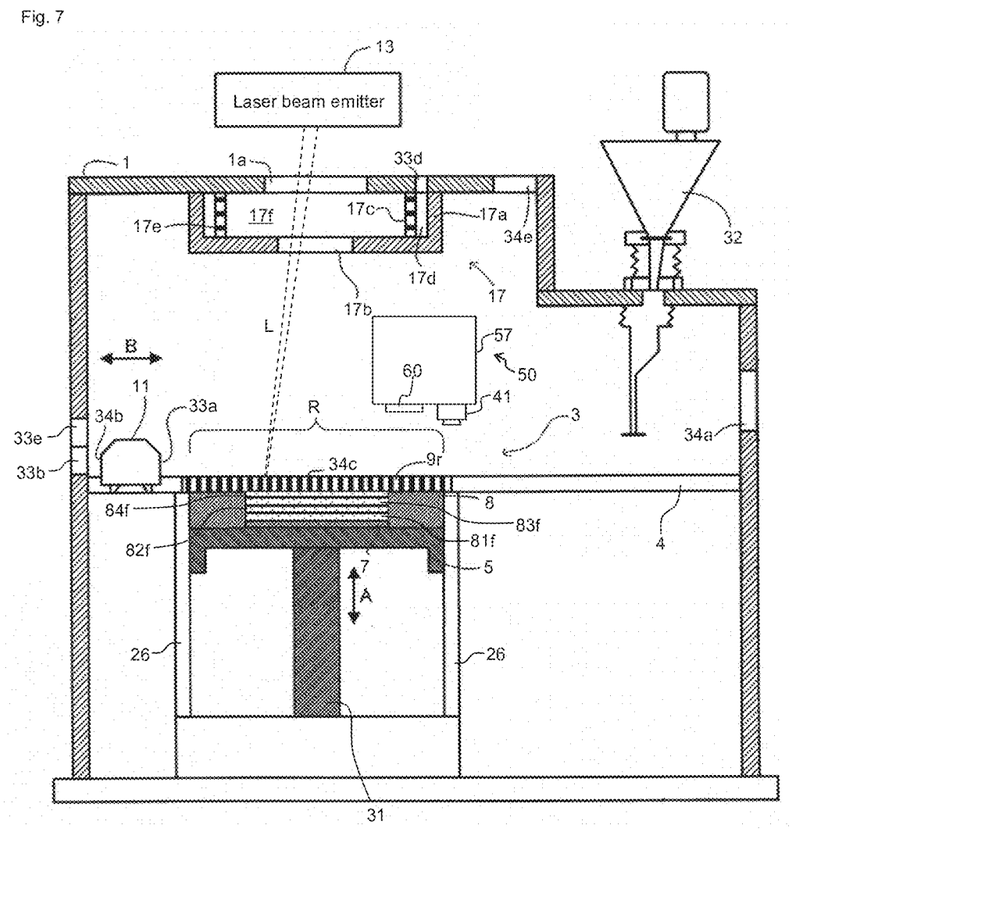
FIG. 7 is a diagram for explaining the lamination molding method using the lamination molding apparatus according to one embodiment of the present invention.

Next, predetermined portion of the material powder layer 8 is irradiated with the laser beam L, thereby sintering the portion of the material powder layer 8 being irradiated with the laser beam. Accordingly, the second layer of sintered layer 82f is obtained as shown in FIG. 7.

By repeating these procedures, the third layer of sintered layer 83f, the fourth layer of sintered layer 84f, and the sintered layers thereafter are formed. The adjacent sintered layers are firmly fixed with each other.

Preferably, for the purpose of enhancing the surface accuracy of a sintered object, every time every time the number of the sintered layers reaches the predetermined number, a cutting step to perform cutting to the sintered layer by the mounted rotary cutting tool attached to the spindle head 60 may be performed.

Non-sintered material powder is removed after forming a desired number of the sintered layers, thereby the molded sintered object can be obtained. The sintered object is applicable to a mold for the resin molding for example.

(Correction Method)

Next, referring to FIGS. 8 and 9, a correction method ("a correction method for correcting positional displacement of a lamination molding apparatus" in claims) with respect to coordinates of the position of the laser beam L emitted by laser beam emitter 13 (laser beam coordinates) and coordinates of the rotary cutting tool mounted on the spindle head 60 (spindle coordinates) will be explained. The correction may be performed before the molding of the first layer of the sintered layer or during the molding process.

Figure 8:
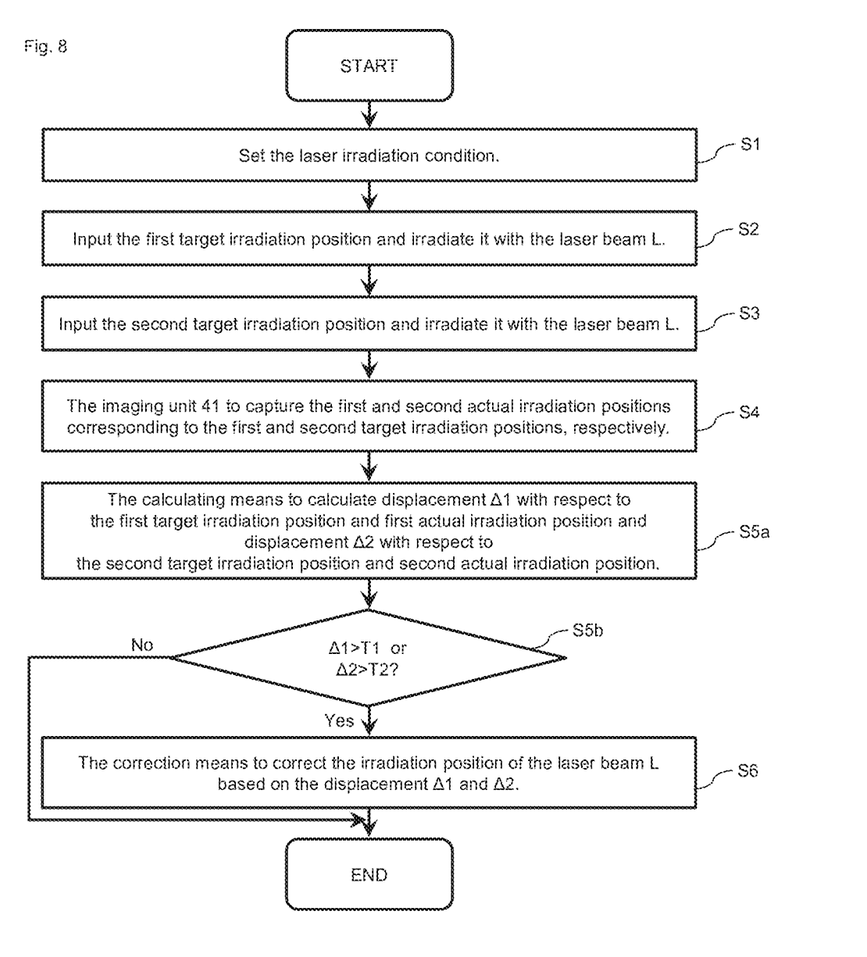
FIG. 8 is a flowchart showing a correction method using a lamination molding apparatus according to one embodiment of the present invention.
Figure 9:
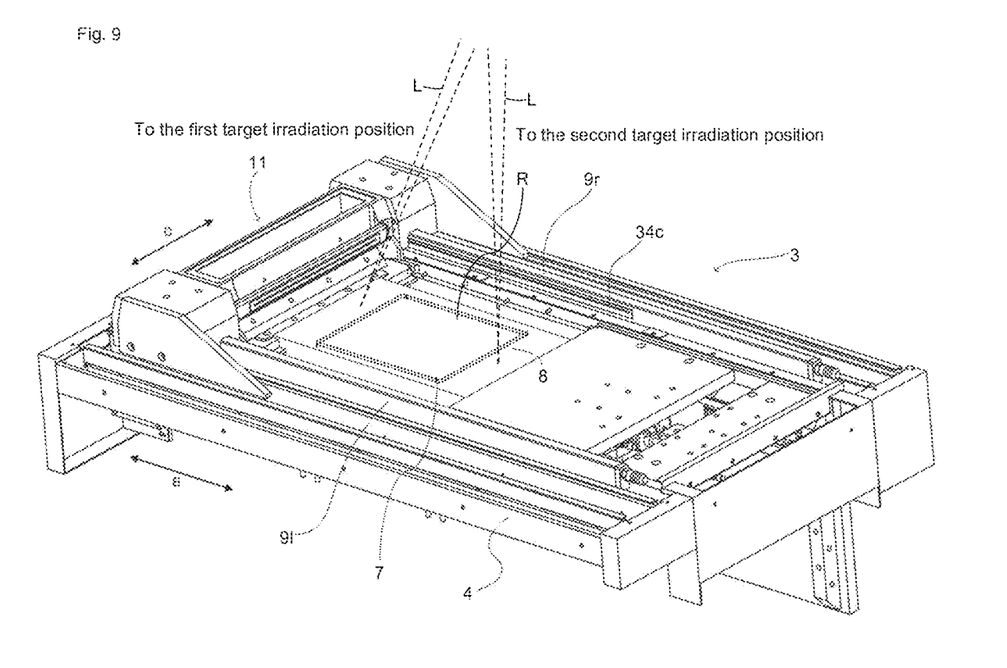
FIG. 9 is a diagram for explaining the correction method using the lamination molding apparatus according to one embodiment of the present invention.

Hereinafter, it will be explained in accordance with each step as shown in FIG. 8.

(Step S1)

First, laser irradiation condition suitable for forming the sintered trace is set, which is, for example, the intensity of the laser, spot diameter, irradiation position and the like. Here, the irradiation position is assumed a first target irradiation position and second target irradiation position. Further, as shown in FIG. 9, the first target irradiation position and second target irradiation position are assumed positioned in a margin region, which is located outside of the molding plate 7 on the molding table 5. In the molding process of a predetermined lamination molded object, the margin region is a region in which the lamination molded object is never formed regardless of the shape of a desired lamination molded object. Therefore, if the first target irradiation position and second target irradiation position are set within the margin region, the set of each target irradiation position in consideration of the shape of the molded object may not be necessary, which is preferable.

(Step S2)

The rotation angle controlling signal corresponding to the first target irradiation position is input to the galvanometer mirrors 43a and 43b, respectively. The galvanometer mirrors 43a and 43b face directions with predetermined angles, respectively. As shown in FIG. 9, the laser beam L emitted from the laser beam source 42 is irradiated on the actual irradiation position which is a predetermined position corresponding to the first target irradiation position, through the galvanometer mirrors 43a and 43b. The region is covered with the material powder, and the first sintered trace is formed by sintering part of the material powder.

(Step S3)

The rotation angle controlling signal corresponding to the second target irradiation position is input to the galvanometer mirrors 43a and 43b, respectively. The galvanometer mirrors 43a and 43b face directions with predetermined angles, respectively. As shown in FIG. 9, the laser beam L emitted from the laser beam source 42 is irradiated on the actual position which is a predetermined position corresponding to the second target irradiation position, through the galvanometer mirrors 43a and 43b. The region is covered with the material powder, and the second sintered trace is formed by sintering part of the material powder.

(Step S4)

The imaging unit 41 captures the first and second sintered traces formed in Steps S2 and S3.

(Step S5a)

Using the image including the first and second sintered traces captured in Step S4, a predetermined calculating means calculates an actual irradiation position corresponding to the first target irradiation and an actual irradiation position corresponding to the second target irradiation position. Preferably, the actual irradiation position is calculated as a predetermined characteristic point in the sintered trace. If the spot shape of the sintered trace is substantially a circle, the actual irradiation position may be substantially the center position of the circle. Alternatively, the laser beam L may be scanned such that the sintered trace trajectory forms a ring shape, cross shape or the like. In such cases, the actual irradiation position is substantially the center position of the ring or the intersection position of the cross.

Then, the calculating means calculates displacement Δ1 with respect to the first target irradiation position and first actual irradiation position, and displacement Δ2 with respect to the second target irradiation position and second actual irradiation position. Note that the calculating means is preferably, for example, the control device, control circuit or the like (not shown), capable of controlling the galvanometer mirrors 43a and 43b.

(Step S5b)

Further, the calculating means compares the displacement Δ1 and a predetermined threshold value T1, and compares the displacement Δ2 and a predetermined threshold value T2. In the present embodiment, it proceeds to the following step S6 if at least one of the following equations (1) and (2) is fulfilled, and it ends the process if not:

$$\Delta 1 > T1 \quad (1)$$

$$\Delta 2 > T2 \quad (2)$$

(Step S6)

A predetermined correction means corrects the irradiation position of the laser beam L such that the target irradiation position input and the actual irradiation position of the laser beam L are consistent. Specifically, it is capable of correcting both components of the translational displacement and rotational displacement. That is, the above Δ1 and Δ2 are both due to the translational displacement of X direction Δx, translational displacement of Y direction Δy, and rotational displacement Δ. It is assumed that the column vector indicating an arbitrary target irradiation position is $p={}^T(x_p, y_p)$, and the column vector indicating the actual irradiation position corresponding to the target irradiation position is $q=T(x_q, y_q)$. Then, the equation (3) is satisfied;

$$P = A_R q + d \quad (3)$$

wherein $A_R$ is a two-dimensional rotation matrix with a rotate angle $-\Delta\theta$, d is a column vector of which components are the translational displacement ($d={}^T(\Delta x, \Delta y)$).

Accordingly, $A_R$ and d are calculated from Δ1 and Δ2, and thus the actual irradiation position and target irradiation position can be substantially match by the correction shown in equation (3). In other words, the laser beam coordinates and imaging system coordinates are substantially consistent. Further, the laser beam coordinates and spindle coordinates already having a corresponding relation with the imaging system coordinates are substantially consistent. Note that the predetermined correction means is preferably, for example, the control device, control circuit or the like (not shown), capable of controlling the galvanometer mirrors 43a and 43b.

Note that the sintered trace in the present invention is a trace formed by sintering the material powder so as to be capable of measuring the position, and that the cut trace is a trace formed by being cut so as to be capable of measuring the position. Note that a correction so that a distortion of the laser beam coordinates is removed may be preferably performed, in addition to the correction so that the laser beam coordinates and the spindle coordinates are consistent. An inevitable displacement between a predetermined optical path of the laser beam L on the control device and an actual irradiation trajectory formed on the material powder layer 8 may occur owing to a positional displacement of a light deflector to scan the laser beam L such as the galvanometer mirrors or the apparatus. Therefore, the positional displacement is calculated to correct before the molding process begins. For example, the laser beam L is irradiated to form a grid shape on a calibration plate placed on the molding region R. Then, predetermined positions such as intersections of the grid are captured to measure. The predetermined positions as the target irradiation positions and the actual irradiation positions are compared to calculate displacements. The optical path of the laser beam L is corrected on the basis of the displacements. Thus, the distortion of the laser beam coordinates is removed.

The present invention can be implemented in following manners.

First, in the above embodiment, although two irradiation positions are selected for the correction of the rotational displacement, it may be implemented by selecting three or more irradiation positions. If the rotational displacement is not necessary to correct, it may be implemented by selecting one irradiation position.

Secondly, in the above embodiment, although a pair of the galvanometer mirrors 43a and 43b are selected as a scanning means of the laser beam L, the laser beam L may also be scanned by another means.

Thirdly, in the above embodiment, although the imaging unit 41 is arranged on the machining head 57, the imaging unit 41 may be provided to a position, other than the machining head 57, on the machining head drive mechanism, or may be provided to another position, except for the machining head drive mechanism, within a range capable of capturing the sintered trace. In the former case, since the imaging unit 41 and machining head 57 are arranged on the same drive mechanism, the imaging system coordinates and spindle coordinates correspond to each other due to the structures thereof as well as the above embodiment. In the latter case, a calibration sintered object which is a sintered object different from the desired lamination molded object is formed, for example, on the edge of the molding plate 7. The cut trace is formed on the calibration sintered object with the rotary cutting tool and captured by the imaging unit 41, during or just before the correction so that the laser beam coordinates and the spindle coordinates are consistent, thereby the imaging system coordinates and spindle coordinates may be associated with each other. Then, the sintered trace by laser beam at the position of the cut trace is formed, thereby the laser beam coordinates and spindle coordinates are substantially consistent.

Fourthly, in Step S5b mentioned above, instead of the equations (1) and (2), the following equations (4) and (5) may be adopted.

$$\Delta 1 \geq T1 \quad (4)$$

$$\Delta 2 \geq T2 \quad (5)$$

Fifthly, the above correction method may be implemented during the molding process of the lamination molded object.

Sixthly, instead of the above correction shown in Step S5b, it may be implemented so as to cancel the molding operation of the lamination molded object by the lamination molding apparatus.

Seventhly, it may be implemented so as to form the sintered trace within a region, except for the margin region, in which the sintered layer and the sintered trace are not stuck together or do not overlap each other.

Eighthly, in the above embodiment, although the correction is performed when the positional displacement exceeds the predetermined threshold value, it may be performed each time the arbitrarily set time (predetermined time interval) elapses.

EXPLANATION OF SYMBOLS

1: chamber
1a: window
1d: molding region
3: powder layer firming apparatus
4: base
5: molding table
7: molding plate
8: material powder layer
9l, 9r: elongated members
11: recoater head
11a: material holding section
11b: material supplying section
11c: material discharging section
11fb, 11rb: blade
13: laser beam emitter
15: inert gas supplying apparatus
15a: first inert gas supplying apparatus
15b: second inert gas supplying apparatus
17: fume diffusing device
17a: cylindrical housing
17b: opening
17c: cylindrical diffusing member
17d: inert gas supplying space
17e: pore
17f: clean room
19: fume collector
21, 23: duct box
26: powder retaining wall
31: molding table drive mechanism
32: material supplying device
33a: first supplying opening
33b: second supplying opening
33d: fume diffusing device supplying opening
33e: sub supplying opening
34a: first discharging opening
34b: second discharging opening
34c: third discharging opening
34d: fourth discharging opening
34e: sub discharging opening
35: suction device
42: laser beam source
43a, 43b: galvanometer mirror
44: condensing lens
50: cutting device
57: machining head
60: spindle head
81f, 82f, 83f, 84f: sintered layer
L: laser beam
R: molding region

What is claimed is:

1. A correction method for correcting positional displacement of a lamination molding apparatus, comprising:
    a supplying step to supply a material powder on a molding table;
    a sintering step to form a sintered layer by irradiation of a predetermined irradiation region with a laser beam, the sintered layer being formed by sintering the material powder for each of a plurality of divided layers obtained by dividing a desired three-dimensional object at a predetermined thickness;
    a forming step to form a sintered trace by irradiation of a predetermined target irradiation position with the laser beam, the sintered trace being formed by sintering the material powder;
    a capturing step to capture the sintered trace;
    a calculating step to calculate positional displacement by comparison of the target irradiation position and an actual irradiation position, the actual irradiation position being determined according to the sintered trace;
    a correcting step to correct a laser beam emitter based on the positional displacement such that laser beam coordinates and spindle coordinates are consistent, the laser beam coordinates being coordinates of the laser beam emitter, the spindle coordinates being coordinates of a cutting tool, wherein
    in the forming step, the sintered trace is formed within a region in which the sintered layer and the sintered trace are not stuck together or overlapping each other.

2. The method of claim 1, wherein:
an imaging unit utilized in the capturing step and the cutting tool are provided on a common drive mechanism.

3. The method of claim 1, wherein:
the cutting tool forms a cut trace on the sintered trace and
the cut trace is captured in the capturing step such that imaging system coordinates and spindle coordinates correspond to each other, the imaging system coordinates being coordinates of an imaging unit, the spindle coordinates being coordinates of the cutting tool.

4. The method of claim 1, wherein:
in the correcting step, the laser beam emitter is corrected when the positional displacement is equal to or greater than a predetermined threshold value.

5. The method of claim 1, wherein:
in the correcting step, a molding process of a lamination molded object is cancelled when the positional displacement is equal to or greater than a predetermined threshold value.

6. The method of claim 1, wherein:
at least two of the sintered traces are formed in the forming step and captured in the capturing step.

7. The method of claim 1, wherein:
in the forming step, the sintered trace is formed by sintering the material powder within a margin region, the margin region being disposed, on the molding table, outside of a molding plate.

8. The method of claim 1, wherein:
in the correcting step, the laser beam emitter is corrected at a predetermined time interval.

* * * * *